UNITED STATES PATENT OFFICE.

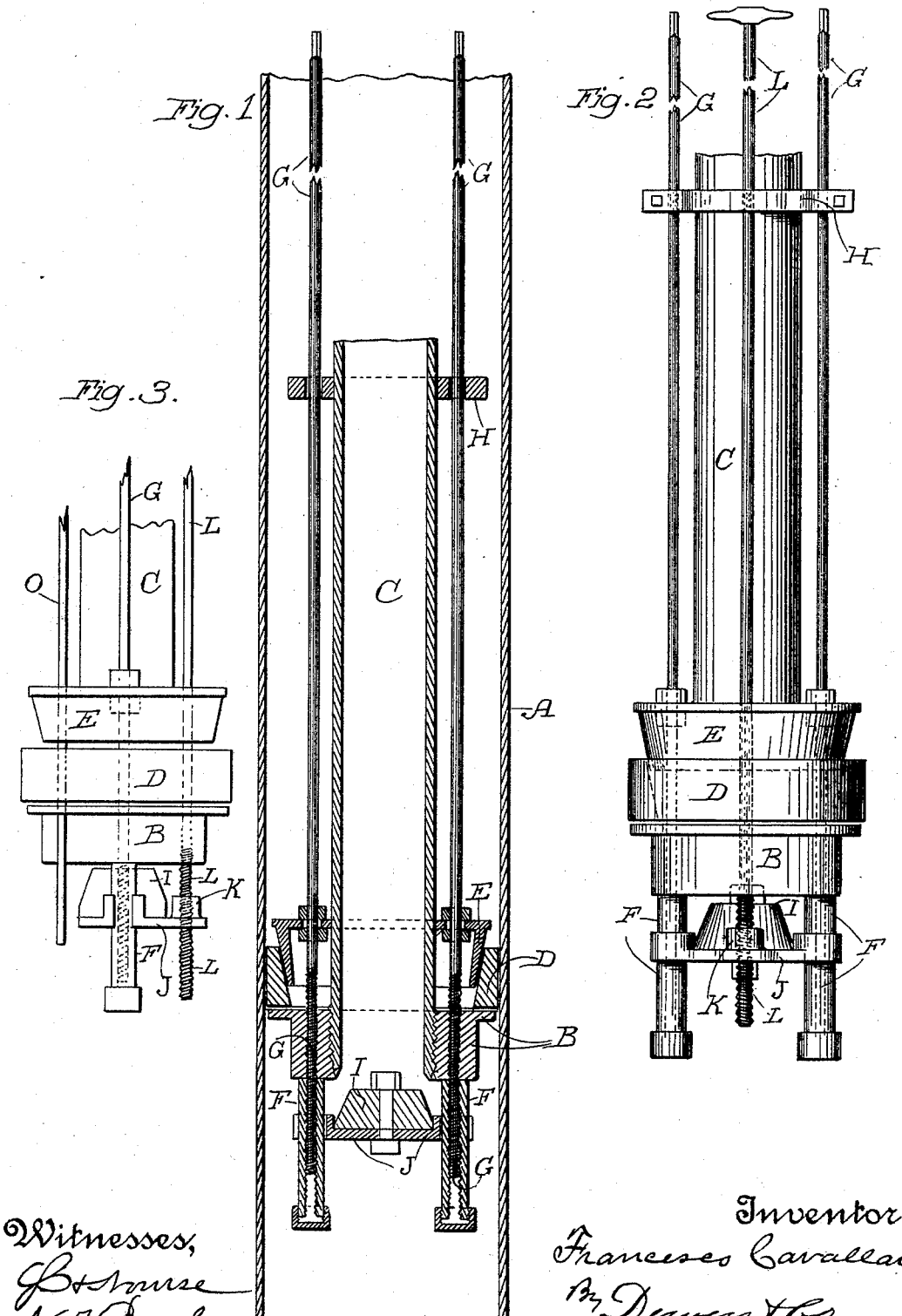

FRANCESCO CAVALLARO, OF SAN JOSÉ, CALIFORNIA.

ATTACHMENT FOR ARTESIAN WELLS.

SPECIFICATION forming part of Letters Patent No. 524,666, dated August 14, 1894.

Application filed November 7, 1893. Serial No. 490,269. (No model.)

*To all whom it may concern:*

Be it known that I, FRANCESCO CAVALLARO, a citizen of the United States, residing at San José, Santa Clara county, State of California, have invented an Improvement in Attachments for Artesian Wells; and I hereby declare the following to be a full, clear, and exact description of the same.

My invention relates to an attachment which is especially applicable for use in Artesian wells.

It consists in certain details of construction which will be more fully explained by reference to the accompanying drawings, in which—

Figure 1 is a vertical section showing its application to a well. Fig. 2 is an exterior view of my device. Fig. 3 is an elevation showing the air pipe.

The object of my invention is to provide a means for hermetically closing the tubes of Artesian wells, so that in case of a flowing well, the water may be stopped at any time, and in case the well has to be pumped, the well tube, itself, will serve as an extension of the suction pipe of a pump.

A is the tube of a well which may be of any desired interior diameter.

B is a flanged disk, into which the suction pipe C of the pump is screwed or otherwise secured.

D is a cylindrical rubber gasket, the interior diameter of which is such in its normal condition that it has about the same diameter as the disk B, and the two will easily slip down within the well tube.

Around the pump tube C is fitted a tapering conical expander E, the lower end of which is of the smallest diameter, so that it will enter the upper part of the rubber gasket when the expander is forced down.

From the bottom of the disk B two interiorly threaded screw sockets F extend a short distance and are closed at the lower end, so that they will retain a quantity of oil for the purpose of lubricating the screws which work therein, and prevent their becoming fixed by rust. The shanks of these screws G extend up through the top plate of the expander, and have collars upon them, one above and one below the plate, so that while they turn loosely in the openings in the plate through which they pass, they will move the expander up or down upon the pump tube or pipe as the screws move in the screw threads of the disk or of the extensions thereof.

Upon the pump tube is clamped a guide H through holes in which the screw shafts pass, and the upper ends of these screw shafts are made to receive a key or handle by which they are turned so as to rotate the screws, and thus advance the expander in either direction.

The operation will then be as follows: The device is let down into the well tube as far as may be desired, and the screws are then turned so as to force the expander down into the rubber gasket, and the latter is expanded until it fits water tight within the tube of the well. The lower end of the suction pipe of the pump passing through the disk is then in connection so as to draw water from the well when the pump is operated, the well tube, itself, forming the continuation of the suction pipe. If the well is a flowing one, or if for other purposes it is desired to close the bottom of the suction pipe, this is done by means of a valve or conical stopper I which is supported upon a yoke J. Each side of the yoke is grooved or channeled so as to fit and move upon the exterior of the tubular extensions below the disk B, and these extensions thus serve as a guide for the yoke and the conical stopper which it carries. Upon one side of the yoke, or both, if necessary, is formed a screw-threaded nut K and a screw L fits this nut. The shank of the screw passes up through a stuffing-box in the disk B, and thence passes up through the top of the expander, and through the guide yoke above to a point where it is within easy reach above the well tube.

Whenever it is desired to close the suction pipe of the pump, and thus prevent any escape of water from the well, it is effected by turning the screw-shaft until the valve has been drawn up to the bottom of the suction pipe of the pump, thus closing the pipe, and as the expansion gasket already closes the remainder of the well tube, the whole well will be sealed and any escape of water therefrom prevented.

If it is desired to remove the device or change its position in the well tube, it may be done at any time by simply turning the screws so as to withdraw the expander, and allow the rubber gasket to contract, when the whole device can be removed or changed to suit.

Having thus described my invention, what I claim as new, and desire to secure by Letters Patent, is—

1. The combination with the tube C having stationary upper and lower flanges H, B, of an intermediate vertically movable tapering annular expander E, an internally tapered annular expansible packer D resting on the flange or collar B, and the screw rods extending down through apertures in the guide flange and expander with their lower threaded ends engaging threaded apertures in the flange or collar B, and the fixed collars on the screw rods at opposite sides of the expander to cause the said expander to be raised or lowered when the screw rods are rotated, substantially as herein described.

2. The combination with the well tube, of a rod extending down along the exterior thereof and turning in a suitable bearing thereon; the lower end of the rod being threaded, a vertically movable closure mounted on suitable guides exterior to the lower end of the tube, and having a threaded aperture in which the threaded end of the said rod works, to raise and lower the closure, substantially as herein described.

3. An attachment for Artesian wells consisting of an expansible collar, an expander by which it is caused to fit within the tube of the well, and mechanism whereby the expander is moved to tighten or loosen the collar, a pump suction tube extending down through the expander and collar and fitting a disk below the latter, and a plug or valve movable with relation to the open lower end of the pump tube, whereby the latter is opened or closed, substantially as herein described.

4. An attachment for Artesian wells consisting of a disk, an expansible collar adapted to fit the interior of the well tube, and an expander and mechanism whereby it is moved to expand the collar or allow it to contract, a pump suction tube extending down through the disk upon which the expander is slidable, a valve or plug, guides below the disk upon which said plug is movable, and a screw engaging a nut and adapted to move the plug to close or open the bottom of the pump tube, the screw shank extending upwardly through suitable packing in the disk to a point above the well tube, substantially as herein described.

5. An attachment for Artesian wells consisting of an elastic expansible collar and disk adapted to fit the interior of the well tube, an expander movable with relation to the collar so as to expand it or allow it to contract, closed sockets extending below the disk and adapted to receive the screw-threaded rods by which the expander is actuated, said extension serving as oil reservoirs into which the screws pass, and by which they are lubricated, substantially as herein described.

In witness whereof I have hereunto set my hand.

FRANCESCO CAVALLARO.

Witnesses:
A. S. MACKENZIE,
J. F. O'KEEFE.